United States Patent [19]

Spackova et al.

[11] 4,411,094
[45] Oct. 25, 1983

[54] ELECTRONIC ROACH TRAP

[76] Inventors: Daniela Spackova, 300 W. 55th St., Apt. 14-S, New York, N.Y. 10019; Richard M. Chen, 51-25 Goldsmith St., Elmhurst, N.Y. 11373

[21] Appl. No.: 350,117

[22] Filed: Feb. 18, 1982

[51] Int. Cl.³ .............................................. A01M 1/10
[52] U.S. Cl. ........................................ 43/121; 43/111
[58] Field of Search ................ 43/121, 111, 139, 107, 43/58

[56] References Cited

U.S. PATENT DOCUMENTS

| 738,184 | 9/1903 | Goodwin | 43/139 |
| 1,807,076 | 5/1931 | Sweet | 43/139 |
| 2,009,583 | 7/1935 | Hunt | 43/121 |
| 2,715,295 | 8/1955 | Brown | 43/107 |
| 2,777,934 | 1/1957 | Falkenthal | 43/139 |

FOREIGN PATENT DOCUMENTS 1119478 7/1968 United Kingdom ................ 43/139

Primary Examiner—Gene Crosby
Attorney, Agent, or Firm—Richard L. Miller

[57] ABSTRACT

A roach trap including a housing removably on a container. A tube is provided between a roach entry compartment and bait compartment, and a disposable bag is contained in the bait compartment for catching roaches urged through the tube by a helical empeller triggered by an electric eye means.

2 Claims, 2 Drawing Figures

ELECTRONIC ROACH TRAP

This invention relates generally to insect traps. More specifically it relates to traps for catching objectionable insects such as roaches in order that they may then be destroyed.

BACKGROUND OF THE INVENTION

It is well known that when cockroaches infest a premises such as a home, restaurant or other place, it is almost impossible to exterminate them completely with conventional methods such as by poisons, because the roaches build up an immunity to the poison, so that different poisons must be used periodically so as to at least keep down the population of these quickly reproducing pest. This situation accordingly is in need of an improvement.

SUMMARY OF THE INVENTION

Therefore, it is a principal object of the present invention to provide a means of getting rid of roaches by trapping them so that they may then be removed from the premises and destroyed such as being thrown into a fire or the like, from which they cannot revive.

Another object is to provide a roach trap which is reusable over and over again.

Yet a further object is to provide a roach trap which eliminates the need of a person to physically come into contact with the trapped roaches so as to not be objectionable.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

The figures on the drawings are briefly described as follows.

DETAILED DESCRIPTION OF THE PREFERRED EMBODIMENT

Figure 1:
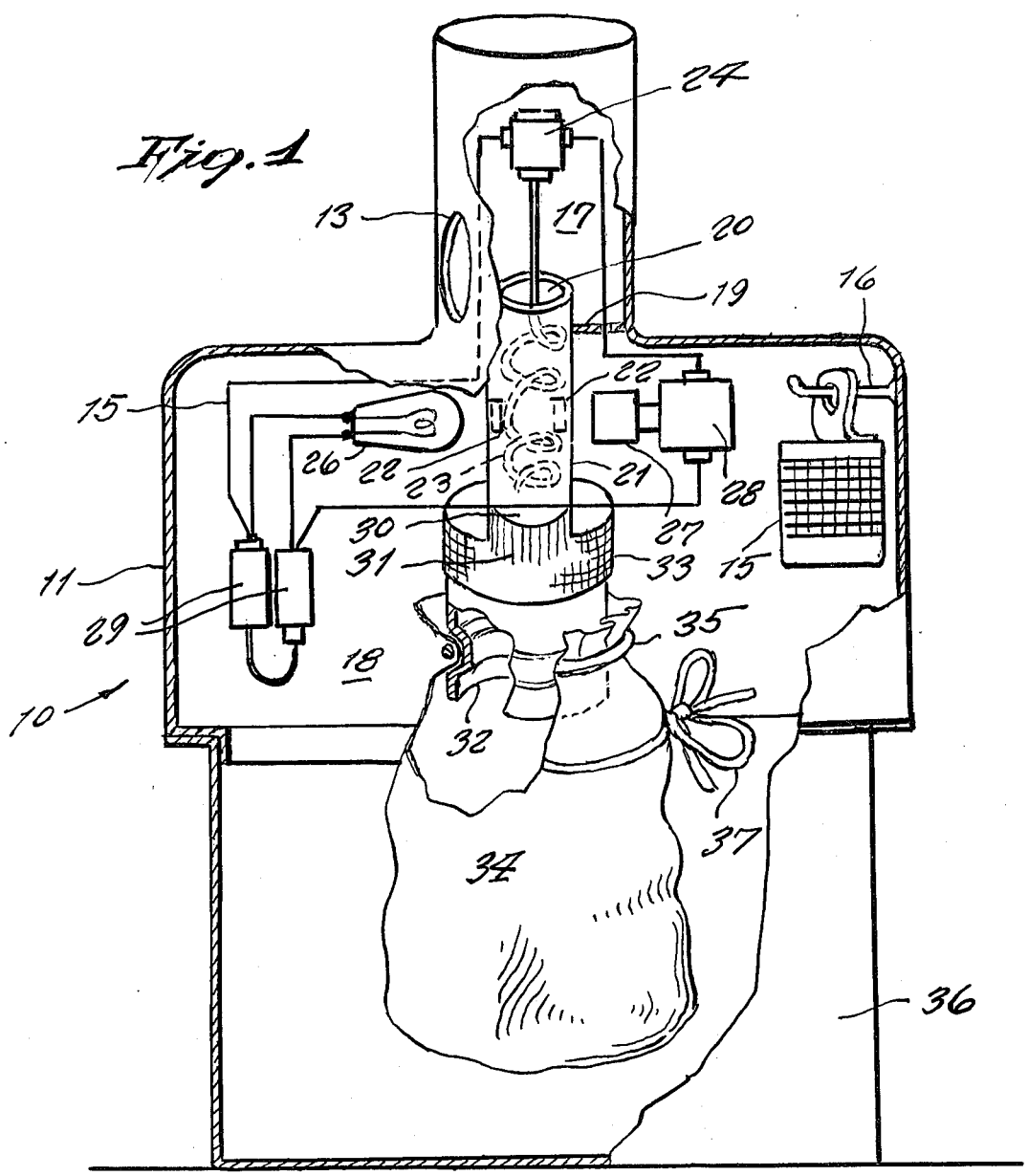
FIG. 1 is a side perspective view of the present invention, shown partly in cross section.
Figure 2:
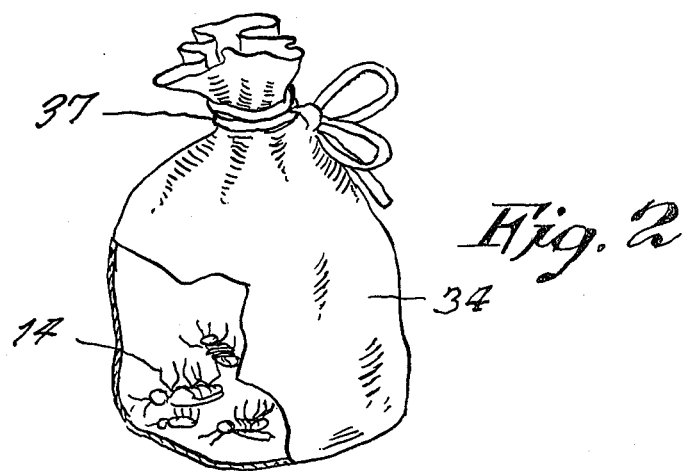
FIG. 2 is a perspective view of a disposable bag after removal from the trap invention, shown containing captured roaches for being then destroyed.

Referring now to the drawing in greater detail, the reference numeral 10 represents an electronic roach trap, according to the present invention, wherein there is a hollow housing 11 upper portion having a plurality of holes 13 around its side so that cockroaches 14 may enter thereinto; the roaches being attracted inside by bait being placed inside a closed, wire mesh basket 15 hung from a hook 16 inside the housing.

A compartment 17 is inside the housing portion and is separated from a compartment 18 therebelow by means of a floor 19 having a central hole 20 through which odors of the bait in the basket 15, (located inside the compartment 18) attracts the roaches into the hole.

A downward tube 21 with windows 22 on its opposite sides, extends down through a hole in the floor so that the roach must travel down through the tube. A helical impeller 23, inside the tube, is made from a coiled wire which at its upper end is rotated by an electric motor 24 located inside the compartment 17. The motor is in an electric circuit that includes electric eye components 26 and 27 in front of the windows so as to be activated by a roach therebetween as he travels inside the tube. The component 26 is a light or infrared emitter while the component 27 is a light or infrared ray detector in an inverting amplifier circuit unit 28; the unit 28 and the emitter being connected to batteries 29 in the circuit 25. Thus the presence of the roach between the components 26 and 27 activates the motor so as to rotate the helical impeller, which serves to sweep the roach downward through the tube into a vestibule 30 surrounded by barrier whiskers 31 so that they cannot escape sideward therefrom. The barrier permits the bait odors to enter the tube so as to attract the roaches thereinto. The vestibule is at an upper end of the sleeve 32, where a wire mesh window 33, around the tube likewise prevents a roach from escaping sidewardly. A disposable bag 34 is tied around the lower end of the sleeve by means of a resilient rubber band 35 the bag hanging downwardly into a container 36 located removably under the housing 11. The roaches fall through the sleeve and into the bag.

To dispose of the trapped roaches, the housing is lifted off the container, and the bag is slipped off the sleeve; and a string 37 is tied so as to close the top of the bag and prevent any roaches from escaping. The bag may then be thrown into a fire or otherwise destroyed with the roaches inside.

While certain novel features of this invention have been shown and described and are pointed out in the annexed claims, it will be understood that various omissions, substitutions and changes in the forms and details of the device illustrated and in its operation can be made by those skilled in the art with out departing from the spirit of the invention.

I claim:

1. An electronic roach trap, comprising in combination, a hollow housing removably placed on a container, an upper and lower compartment in said housing, a tube therebetween, entry openings for roaches into said upper compartment, a bait means in said lower compartment, and electric eye means for actuating a helical empeller to force said roaches down through said tube, and a sleeve therebelow holding a disposal bag.

2. The combination as set forth in claim 1, wherein a vestibule between said tube and sleeve is surrounded by barrier whiskers so as to prevent sideward escape of said roaches.

* * * * *